United States Patent
Tamura (10) Patent No.: US 12,036,984 B2
(45) Date of Patent: Jul. 16, 2024

(54) VEHICLE TRAVEL CONTROL APPARATUS

(71) Applicant: Honda Motor Co., Ltd., Tokyo (JP)

(72) Inventor: Sho Tamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 17/411,252

(22) Filed: Aug. 25, 2021

(65) Prior Publication Data
US 2022/0063615 A1 Mar. 3, 2022

(30) Foreign Application Priority Data

Aug. 28, 2020 (JP) .................................. 2020-144505

(51) Int. Cl.
| | | |
|---|---|---|
| G01C 21/00 | (2006.01) | |
| B60W 30/12 | (2020.01) | |
| G06V 20/56 | (2022.01) | |
| G01C 21/36 | (2006.01) | |

(52) U.S. Cl.
CPC ............ *B60W 30/12* (2013.01); *G06V 20/588* (2022.01); *B60W 2420/403* (2013.01); *B60W 2554/4041* (2020.02); *G01C 21/3667* (2013.01)

(58) Field of Classification Search
CPC ............. B60W 30/12; B60W 2420/42; B60W 2554/4041; B60W 2050/0091; B60W 2556/40; B60W 2556/50; B60W 40/06; B60W 60/0011; B60W 60/0027; B60W 60/0053; B60W 30/165; B60W 60/001; B60W 60/005; G06V 20/588; G06V 20/58; G01C 21/3667; G01C 21/3453
See application file for complete search history.

(56) References Cited

U.S. PATENT DOCUMENTS

| | | | | |
|---|---|---|---|---|
| 9,224,053 | B1 * | 12/2015 | Ferguson | .............. B60W 30/12 |
| 10,449,967 | B1 * | 10/2019 | Ferguson | ............. G08G 1/0112 |
| 10,599,155 | B1 * | 3/2020 | Konrardy | .............. B60W 10/04 |

(Continued)

FOREIGN PATENT DOCUMENTS

| | | |
|---|---|---|
| JP | 2002008199 A | 1/2002 |
| JP | 2005332192 A | 12/2005 |
| JP | 6614353 B2 | 12/2019 |

OTHER PUBLICATIONS

Japanese Office action; Application 2020-144505; dated May 17, 2022.

*Primary Examiner* — Tiffany P Young
(74) *Attorney, Agent, or Firm* — Duft & Bornsen, PC (57) ABSTRACT

A vehicle travel control apparatus configured to control a traveling operation of a vehicle including an actuator for traveling, including a first sensor mounted on the vehicle to capture an image of a division line in a traveling direction of the vehicle or measure the division line, a second sensor mounted on the vehicle to detect a movement of a preceding vehicle, and an electronic control unit including a microprocessor and a memory connected to the microprocessor. The microprocessor is configured to perform controlling the actuator based on a position information of the division line obtained by the first sensor and a reliability with respect to the position information of the division line obtained by the first sensor, and the controlling including decreasing the reliability when a predetermined movement of the preceding vehicle to intersect the division line is detected by the second sensor.

13 Claims, 5 Drawing Sheets

(56) References Cited

U.S. PATENT DOCUMENTS

| | | | |
|---|---|---|---|
| 10,821,975 B2* | 11/2020 | Kokido | B62D 6/00 |
| 2012/0314070 A1* | 12/2012 | Zhang | B60W 40/00 |
| | | | 348/148 |
| 2018/0111613 A1* | 4/2018 | Oh | G06V 20/588 |
| 2018/0237006 A1* | 8/2018 | Ishii | B60W 50/0225 |
| 2019/0300013 A1* | 10/2019 | Shiraishi | B60W 60/0053 |
| 2019/0310633 A1* | 10/2019 | Toyoda | B60Q 5/005 |
| 2020/0218908 A1* | 7/2020 | Lee | G06V 10/82 |
| 2020/0369293 A1* | 11/2020 | Jeon | B60W 40/08 |
| 2022/0227367 A1* | 7/2022 | Kario | B60W 30/0956 |

* cited by examiner

VEHICLE TRAVEL CONTROL APPARATUS

CROSS-REFERENCE TO RELATED APPLICATION

This application is based upon and claims the benefit of priority from Japanese Patent Application No. 2020-144505 filed on Aug. 28, 2020, the content of which is incorporated herein by reference.

BACKGROUND OF THE INVENTION

Field of the Invention

This invention relates to a vehicle travel control apparatus controlling a travel operation of a vehicle based on information obtained by a vehicle-mounted camera, etc.

Description of the Related Art

As this type of apparatus, conventionally, there is a known apparatus for controlling a traveling actuator so as to follow a preceding vehicle, based on an image signal from a camera mounted on a vehicle. Such an apparatus is described, for example, in Japanese Patent Publication No. 6614353 (JP6614353B). In the apparatus described in JP6614353B, a division line of a lane in which the subject vehicle travels is detected based on the image signal from the camera, and a lane keeping control of the vehicle is performed based on the detected division line.

However, due to lane change or the like of the preceding vehicle, the recognition accuracy of the division line by the camera image may deteriorate, and thus there is a possibility that hinders the traveling control of the vehicle.

SUMMARY OF THE INVENTION

An aspect of the present invention is a vehicle travel control apparatus configured to control a traveling operation of a vehicle including an actuator for traveling. The vehicle travel control apparatus includes: a first sensor mounted on the vehicle to capture an image of a division line in a traveling direction of the vehicle or measure the division line; a second sensor mounted on the vehicle to detect a movement of a preceding vehicle; and an electronic control unit including a microprocessor and a memory connected to the microprocessor. The microprocessor is configured to perform: controlling the actuator based on a position information of the division line obtained by the first sensor and a reliability with respect to the position information of the division line obtained by the first sensor, and the controlling including decreasing the reliability when a predetermined movement of the preceding vehicle to intersect the division line is detected by the second sensor.

Another aspect of the present invention is a vehicle travel control apparatus configured to control a traveling operation of a vehicle including an actuator for traveling. The vehicle travel control apparatus includes: a first sensor mounted on the vehicle to capture an image of a division line in a traveling direction of the vehicle or measure the division line; a second sensor mounted on the vehicle to detect a movement of a preceding vehicle; and an electronic control unit including a microprocessor and a memory connected to the microprocessor. The microprocessor is configured to perform: controlling the actuator based on a position information of the division line obtained by the first sensor, and the controlling including controlling the actuator based on the position information of the division line obtained by the first sensor when a predetermined movement of the preceding vehicle to intersect the division line is not detected by the second sensor, while stopping controlling the actuator based on the position information of the division line obtained by the first sensor when the predetermined movement is detected by the second sensor.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1A to 5. A vehicle travel control apparatus according to an embodiment of the present invention is applied to a vehicle having a driver assistance capability or a self-driving capability. In the following description, an example in which the vehicle travel control apparatus is applied to the vehicle having the self-driving capability (self-driving vehicle) will be explained. The self-driving vehicle may be sometimes called "subject vehicle" to differentiate it from other vehicles.

Figure 1A:
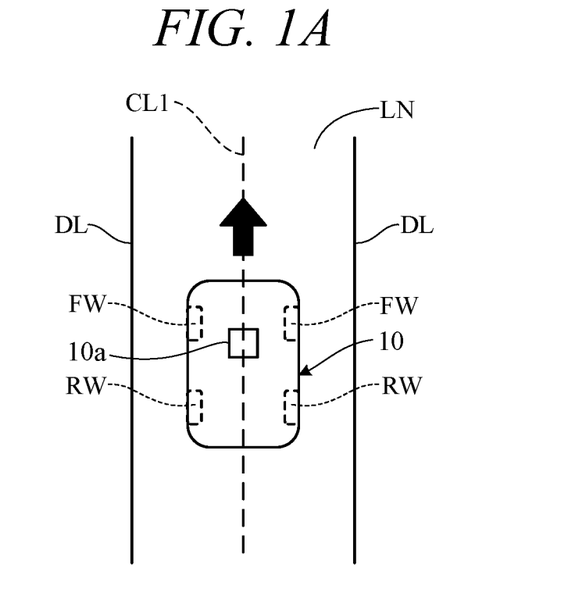
FIG. 1A is a plan view schematically illustrating an example of a traveling scene of a subject vehicle to which a vehicle travel control apparatus according to an embodiment of the invention is applied.
Figure 1B:
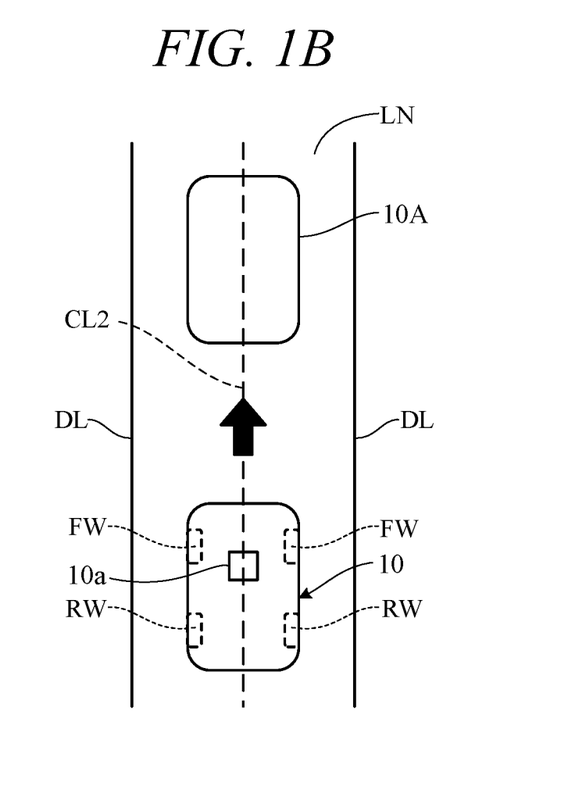
FIG. 1B is a plan view schematically illustrating another example of a traveling scene of the subject vehicle to which the vehicle travel control apparatus according to then embodiment of the invention is applied.

FIGS. 1A and 1B are respectively plan views of a road schematically illustrating an example of a traveling scene of the subject vehicle 10. In particular, FIG. 1A is an example in which the subject vehicle 10 travels along a lane LN defined by a pair of left and right division lines DL extending in parallel to each other, that is, an example in which the subject vehicle 10 travels in a lane keeping manner. In the lane keeping travel, the subject vehicle 10 travels, for example, along a center line CL1 passing through the center of the left and right division lines DL. FIG. 1B is an example in which the subject vehicle 10 travels in an arrow direction along a preceding vehicle 10A (also referred to as a front vehicle) that travels in front of the subject vehicle 10 on the same lane LN as the subject vehicle 10, that is, an example in which the subject vehicle 10 travels in a follow-up manner. In the following travel, the subject vehicle 10 travels, for example, along a travel track CL2 of the preceding vehicle 10A. The division line DL includes a boundary line of a plurality of the lanes LN, a boundary line between a sidewalk or a bicycle road and the lane LN, a center line of a two-way traffic, and the like.

The subject vehicle 10 is configured as a four-wheel drive vehicle having a pair of left and right front wheels FW and a pair of left and right rear wheels RW. The subject vehicle 10 includes a travel drive source 10a for generating a travel driving force, a not-shown braking device for braking the subject vehicle 10 and a not-shown turning device for turning the front wheels FW. The travel drive source 10a is an internal combustion engine (engine), travel motor or both of the engine and the travel motor. Therefore, the subject vehicle is an engine vehicle, electric vehicle or hybrid vehicle.

The subject vehicle 10 can travel not only in a self-drive mode in which a driving operation by a driver is unnecessary, but also in a manual drive mode in which the driving operation by the driver is necessary. For example, in a state where the vehicle travels in the self-drive mode without operating (hands-off) a steering wheel, the vehicle can travel in the manual drive mode by operating (hands-on) the steering wheel. Alternatively, the vehicle can travel in the hands-on state by lowering an automatic driving level by one step or two or more steps in accordance with a command from a vehicle control system from the state of traveling in the hands-off state at a predetermined automatic driving level.

Figure 2:
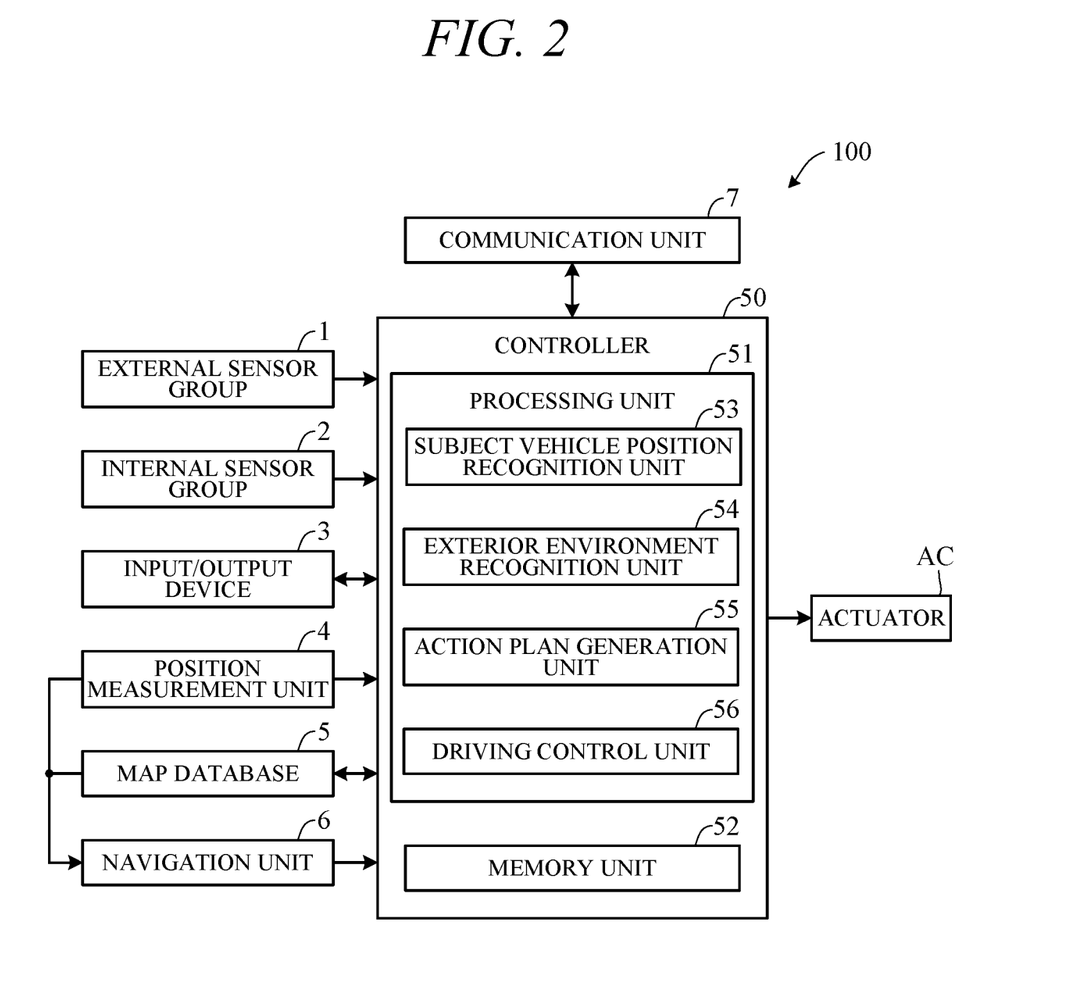
FIG. 2 is a block diagram schematically illustrating an overall configuration of a vehicle control system having the vehicle travel control apparatus according to the embodiment of the present invention.

FIG. 2 is a block diagram schematically illustrating an overall configuration of a vehicle control system 100 having the vehicle travel control apparatus according to an embodiment of the present invention. As shown in FIG. 2, the vehicle control system 100 mainly includes a controller 50, and an external sensor group 1, an internal sensor group 2, an input/output device 3, a position measurement unit 4, a map database 5, a navigation unit 6, a communication unit 7 and actuators AC which are communicably connected with the controller 50.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle 10 to ambient obstacles by measuring scattered light produced by laser light radiated from the subject vehicle 10 in every direction, a RADAR (Radio Detection and Ranging) for detecting other vehicles and obstacles around the subject vehicle 10 by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle 10. For example, the internal sensor group 2 includes, inter alia, a vehicle speed sensor for detecting vehicle speed of the subject vehicle 10, acceleration sensors for detecting forward-rearward direction acceleration and lateral acceleration of the subject vehicle 10, respectively, rotational speed sensor for detecting rotational speed of the travel drive source 10a, a yaw rate sensor for detecting rotation angle speed around a vertical axis passing center of gravity of the subject vehicle 10 and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle 10 based on signal received by the position measurement sensor.

The map database 5 is a unit storing general map data used by the navigation unit 6 and is, for example, implemented using a hard disk or semiconductor element. The map data include road position data and road shape (curvature etc.) data, along with intersection and road branch position data. The map data stored in the map database 5 are different from high-accuracy map data stored in a memory unit 52 of the controller 50.

The navigation unit 6 retrieves target road routes to destinations input by the driver and performs guidance along selected target routes. Destination input and target route guidance is performed through the input/output device 3. Target routes are computed based on current position of the subject vehicle 10 measured by the position measurement unit 4 and map data stored in the map database 35.

The communication unit 37 communicates through networks including the Internet and other wireless communication networks to access servers (not shown in the drawings) to acquire map data, traffic data and the like, periodically or at arbitrary times. The networks include not only public wireless communications network, but also closed communications networks, such as wireless LAN, Wi-Fi and Bluetooth, which are established for a predetermined administrative area. Acquired map data are output to the map database 5 and/or memory unit 52 via the controller 50 to update their stored map data.

The actuators AC are actuators for traveling of the subject vehicle 10. If the travel drive source 10a is the engine, the actuators AC include a throttle actuator for adjusting opening angle of the throttle valve of the engine (throttle opening angle). If the travel drive source 10a is the travel motor, the actuators AC include the travel motor. The actuators AC also include a brake actuator for operating a braking device and turning actuator for turning the front wheels FW.

The controller 50 is constituted by an electronic control unit (ECU). More specifically, the controller 50 incorporates a computer including a CPU or other processing unit (a microprocessor) 51 for executing a processing in relation to travel control, the memory unit (a memory) 52 of RAM, ROM and the like, and an input/output interface or other peripheral circuits not shown in the drawings. In FIG. 2, the controller 50 is integrally configured by consolidating multiple function-differentiated ECUs such as an engine control ECU, a transmission control ECU and so on. Optionally, these ECUs can be individually provided.

The memory unit 52 stores high-accuracy detailed road map data (road map information). The road map information includes information on road position, information on road shape (curvature, etc.), information on gradient of the road, information on position of intersections and branches, information on the number of lanes, and information on width of the lane LN and the position of each lane. The position information for each lane is information on position of the center of the lane LN and information on the boundary line of the lane LN, i.e., position information of the division line DL. In addition, the road map information includes information on road surface profile (road surface property) at each position of the road, that is, the value of the unevenness of the road surface from the reference height, and information representing the change of the unevenness (gradient of the road surface). The memory unit 52 also stores information such as programs for various controls, and thresholds used in the programs.

As functional configurations in relation to mainly self-driving, the processing unit 51 includes a subject vehicle position recognition unit 53, an external environment recognition unit 54, an action plan generation unit 55, and a driving control unit 56.

The subject vehicle position recognition unit 53 recognizes the position of the subject vehicle 10 (subject vehicle position) on the map based on position information of the subject vehicle 10 calculated by the position measurement unit 4 and map information stored in the map database 5. Optionally, the subject vehicle position can be recognized using map information (building shape data, road surface profile data and the like) stored in the memory unit 52 and ambience data of the subject vehicle 10 detected by the external sensor group 1, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 7.

The external environment recognition unit 54 recognizes external circumstances around the subject vehicle 10 based on signals from cameras, LIDERs, RADARS and the like of the external sensor group 1. For example, it recognizes position, speed and acceleration of nearby vehicles (forward vehicle or rearward vehicle) driving in the vicinity of the subject vehicle 10, position of vehicles stopped or parked in the vicinity of the subject vehicle 10, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 55 generates a driving path (target path) of the subject vehicle 10 from present time point to a certain time ahead based on, for example, a target route computed by the navigation unit 6, subject vehicle position recognized by the subject vehicle position recognition unit 53, and external circumstances recognized by the external environment recognition unit 54. When multiple paths are available on the target route as target path candidates, the action plan generation unit 55 selects from among them the path that optimally satisfies legal compliance, safe efficient driving and other criteria, and defines the selected path as the target path. The action plan generation unit 55 then generates an action plan matched to the generated target path. An action plan is also called "travel plan". The action plan generation unit 55 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 55 first decides a drive mode and generates the target path in line with the drive mode.

In self-drive mode, the driving control unit 56 controls the actuators AC to drive the subject vehicle 10 along target path generated by the action plan generation unit 55. More specifically, the driving control unit 56 calculates required driving force for achieving the target accelerations of sequential unit times calculated by the action plan generation unit 55, taking running resistance caused by road gradient and the like into account. And the driving control unit 56 feedback-controls the actuators AC to bring actual acceleration detected by the internal sensor group 2, for example, into coincidence with target acceleration. In other words, the driving control unit 56 controls the actuators AC so that the subject vehicle 10 travels at target speed and target acceleration. On the other hand, in manual drive mode, the driving control unit 56 controls the actuators AC in accordance with driving instructions by the driver (steering operation and the like) acquired from the internal sensor group 2.

When the subject vehicle 10 travels in self-drive mode, for example, in the lane keeping manner by the vehicle control system 100 thus configured, the controller 50 recognizes the left and right division lines DL on the road surface in the traveling direction of the subject vehicle 10 based on an image or the like captured by the in-vehicle camera, and controls the actuator AC so that the subject vehicle 10 travels along a center line (FIG. 1A) inside the left and right division lines DL. In addition, when the subject vehicle 10 follows the preceding vehicle 10A in self-drive mode, the controller 50 recognizes the preceding vehicle 10A and the division lines DL, and controls the actuator AC such that the subject vehicle 10 travels along the travel track CL2 (FIG. 1B) of the preceding vehicle 10A inside the left and right division lines DL. Therefore, in order to perform self-driving well, it is necessary for the vehicle control system 100 (controller 50) to accurately recognize the division line DL by signal from the in-vehicle camera or the like.

However, for example, if the preceding vehicle 10A cuts in front of the subject vehicle 10 or if the preceding vehicle 10A traveling in the same lane as the subject vehicle 10 changes lanes, images of the preceding vehicle 10A detected by the in-vehicle camera intersect with images of the division lines DL. For this reason, images of the division lines DL may be interrupted, causing a decrease in the accuracy of recognition of the division lines DL. When the recognition accuracy of the division line DL decreases, the automatic driving level is automatically lowered by the vehicle control system 100. As a result, it becomes necessary for the driver to operate the steering wheel and drive (for example, drive in manual drive mode), and it becomes difficult for the subject vehicle 10 to continuously travel by self-driving. Thus, in the present embodiment, the vehicle travel control apparatus is configured as follows so that the vehicle travel control can be performed well even when the recognition accuracy of the division line DL based on the signal from the in-vehicle camera or the like decreases.

Figure 3:
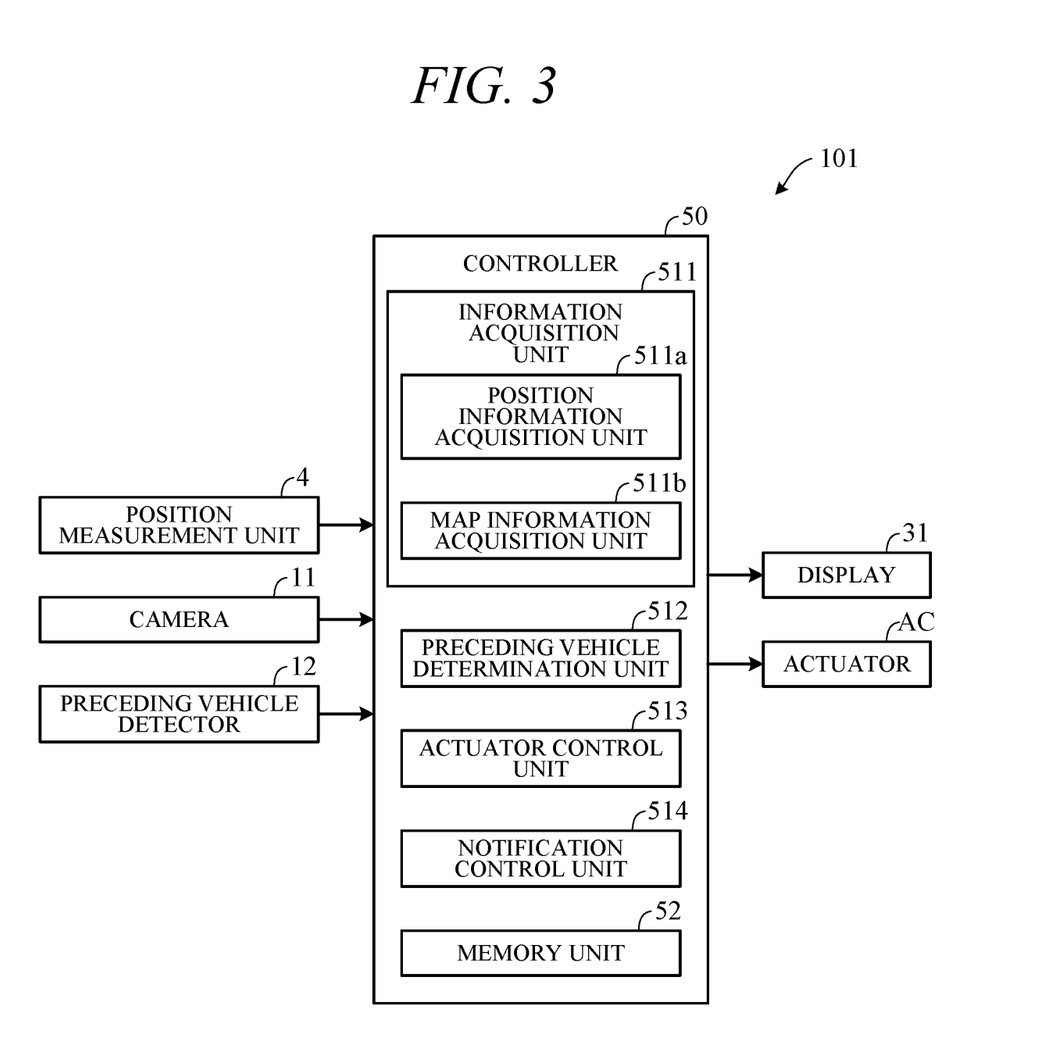
FIG. 3 is a block diagram illustrating a configuration of main part of the vehicle travel control apparatus according to the embodiment of the present invention.

FIG. 3 is a block diagram illustrating a configuration of main part of a vehicle travel control apparatus 101 according to the embodiment of the present invention. The vehicle travel control apparatus 101 mainly controls traveling operation of the subject vehicle 10 in self-drive mode, and constitutes a part of the vehicle control system 100 of FIG. 2. As illustrated in FIG. 3, the vehicle travel control apparatus 101 includes the controller 50, the position measurement unit 4, a camera 11, a preceding vehicle detector 12, a display 31, and the actuator AC.

The camera 11 is a monocular camera having an imaging element (image sensor) such as a CCD or a CMOS, and constitutes a part of the external sensor group 1 in FIG. 2. The camera 11 is attached to, for example, a predetermined position in the front of the subject vehicle 10, continuously captures an image of a space in front of the subject vehicle 10, and acquires an image (camera image) of an object. The object includes the pair of left and right division lines DL obliquely ahead of the vehicle. There is a predetermined correlation between a position of the object on the camera image and an actual position of the object (relative position with respect to the camera 11). This correlation is stored in advance in the memory unit 52, and the actual position of the object (relative position with respect to the camera 11) can be detected from the camera image using this correlation. A stereo camera may be used as the camera 11 instead of the monocular camera, and the actual position of the object may be detected by the stereo camera. The camera images acquired by the camera 11 are transmitted to the controller 50 at predetermined time intervals.

The preceding vehicle detector 12 is a detector that detects the movement of the preceding vehicle, and constitutes a part of the external sensor group 1 in FIG. 2. The preceding vehicle detector 12 includes any one, any two, or all of a radar, a lidar, and the camera 11, for example. The relative position of the preceding vehicle 10A with respect to the subject vehicle 10, more specifically the center position of the preceding vehicle 10A in the left-right direction is identified by using signals from the preceding vehicle detector 12, and the movement track of the center position, that is, the travel track CL2 of the preceding vehicle 10A, can be grasped. Signals from the preceding vehicle detector 12 are transmitted to the controller 50 at predetermined time intervals.

The display 31 is provided, for example, on an instrument panel in a vehicle interior. The display 31 constitutes a part of the input/output device 3 in FIG. 2. The display 31 displays, for example, information for prompting the driver to operate the steering wheel (hands-on) and information for giving notice and notification of switching to the manual drive mode.

The controller 50 includes, as a functional configuration, an information acquisition unit 511, a preceding vehicle determination unit (a determination unit) 512, an actuator control unit 513, a notification control unit 514, and the memory unit 52. The information acquisition unit 511 is included, for example, in the subject vehicle position recognition unit 53 in FIG. 2, the preceding vehicle determination unit 512 is included in the external environment recognition unit 54 in FIG. 2, and the actuator control unit 513 is included in the action plan generation unit 55 and the driving control unit 56 in FIG. 2.

The information acquisition unit 511 includes a position information acquisition unit 511a that acquires information on the current position of the subject vehicle 10, and a map information acquisition unit 511b that acquires information on the road surface profile in the traveling direction of the subject vehicle 10 corresponding to the current position, that is, position information of the division lines DL. The position information acquisition unit 511a acquires the current position information of the subject vehicle 10 based on signal from the position measurement unit 4. The map information acquisition unit 511b acquires the position information of the division lines DL within a predetermined distance (for example, 200 m) in the traveling direction from the current position of the subject vehicle 10 among the road map information stored in the memory unit 52.

Figure 4A:
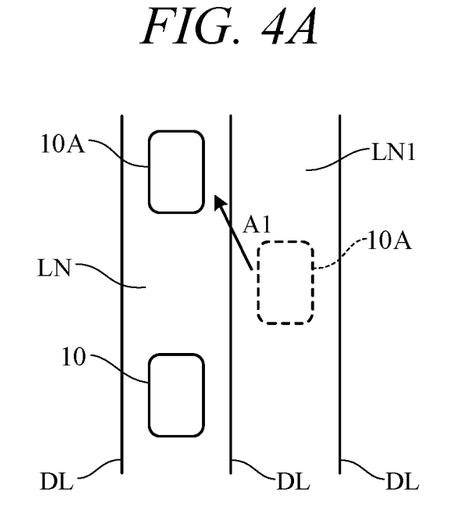
FIG. 4A is a diagram illustrating an example of lowering a recognition accuracy of the division line due to a preceding vehicle.
Figure 4B:
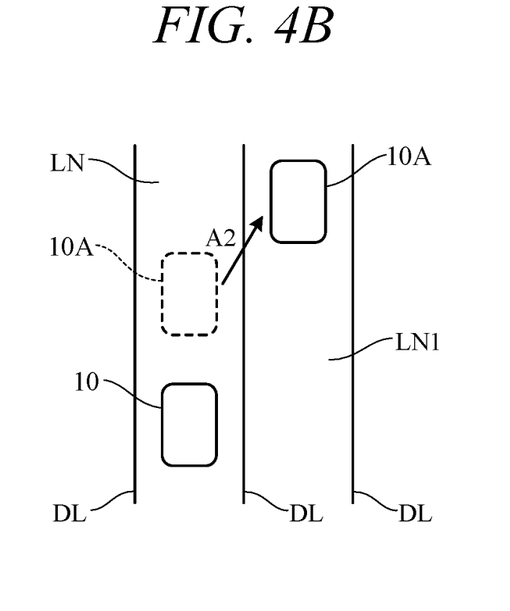
FIG. 4B is a diagram illustrating another example of lowering the recognition accuracy of the division line due to the preceding vehicle.

The preceding vehicle determination unit 512 determines whether images of the division lines DL recognized by the camera 11 intersect with images of the preceding vehicle 10A, that is, whether images of the preceding vehicle 10A cross images of the division lines DL. This determination is as to whether the accuracy of recognition of the division lines DL is lowered due to the behavior of the preceding vehicle 10A. FIGS. 4A and 4B are plan views each illustrating an example in which the accuracy of recognition of the division lines DL is lowered due to the preceding vehicle 10A traveling on a road of two lanes each way. Hereinafter, as illustrated in FIGS. 4A and 4B, other vehicles in front of the subject vehicle 10 that are traveling in a lane (adjacent lane) LN1 adjacent to the lane (current lane) LN in which the subject vehicle 10 is traveling are also referred to as the preceding vehicle 10A.

FIG. 4A is an example in which the preceding vehicle 10A traveling in the adjacent lane LN1 changes lanes as indicated by the arrow A1 to travel in front of the subject vehicle 10. That is, this is an example in which the preceding vehicle 10A cuts in front of the subject vehicle 10 which is performing lane keeping. When the preceding vehicle 10A cuts in front of the subject vehicle 10 in this manner, images of the division lines DL (images of the division line DL on the right side of the subject vehicle 10 in FIG. 4A) are interrupted, and thus the division line DL captured by the camera 11 may be recognized as distorted. In view of this, the preceding vehicle determination unit 512 determines, using signals from the preceding vehicle detector 12, whether the preceding vehicle 10A starts to cut in front of the subject vehicle 10, that is, whether the preceding vehicle 10A starts to change from the adjacent lane LN1 to the current lane LN. Then, in response to determining that the preceding vehicle 10A has started to cut in, the preceding vehicle determination unit 512 determines that the accuracy of recognition of the division lines DL is lowered until determining that the preceding vehicle 10A has finished cutting in.

For example, at the time that images of the division lines DL are interrupted by images of the preceding vehicle 10A traveling in the adjacent lane LN1, the preceding vehicle determination unit 512 determines that the preceding vehicle 10A has started to cut in. The distance between one of the left and right ends (for example, left end) of the preceding vehicle 10A traveling in the adjacent lane LN1 and the division line (right division line) DL of the current lane LN may be calculated, and it may be determined that the preceding vehicle 10A has started to cut in at the time that the distance becomes equal to or less than a predetermined value (first predetermined value). After determining that the preceding vehicle 10A has started to cut in, the preceding vehicle determination unit 512 calculates the distance between the other of the left and right ends (for example, right end) of the preceding vehicle 10A and the division line (right division line) DL which the preceding vehicle 10A has crossed, and determines that the preceding vehicle 10A has finished cutting in at the time that the distance becomes equal to or greater than a predetermined value (second predetermined value). After the preceding vehicle 10A finishes cutting in, the subject vehicle 10 follows the preceding vehicle 10A, for example.

FIG. 4B is an example in which the preceding vehicle 10A (dotted line) changes lanes as indicated by the arrow A2 to move out of the area in front of the subject vehicle 10. That is, this is an example in which the preceding vehicle 10A changes lanes while the subject vehicle 10 is following the preceding vehicle 10A. When the preceding vehicle 10A changes to the adjacent lane LN1 in this manner, images of the division lines DL (images of the division line DL on the right side of the subject vehicle 10 in FIG. 4B) are interrupted, and thus the division line DL captured by the camera 11 may be recognized as distorted. In view of this, the preceding vehicle determination unit 512 recognizes the travel track of the preceding vehicle 10A using signals from the preceding vehicle detector 12, and determines whether the preceding vehicle 10A starts a lane change from the current lane LN to the adjacent lane LN1 on the basis of the travel track. For example, once the distance between the travel track and the division line DL becomes equal to or less than a predetermined value as the travel track approaches the division line DL, the preceding vehicle determination unit 512 determines that the lane change has started. Alternatively, once the difference between the center line obtained from images of the division lines and the travel track becomes equal to or greater than a predetermined value, the preceding vehicle determination unit 512 determines that the lane change has started. Then, in response to determining that the lane change has started, the preceding vehicle determination unit 512 determines that the accuracy of recognition of the division lines DL is lowered until determining that the lane change has finished.

The preceding vehicle determination unit 512 determines that the lane change has started, for example, when the travel track of the preceding vehicle 10A intersects or is predicted to intersect with the division line DL of the current lane LN. The distance between one of the left and right ends (for example, right end) of the preceding vehicle 10A and the division line (right division line) DL of the current lane LN may be calculated, and it may be determined that the lane change has started at the time that the distance becomes equal to or less than a predetermined value (first predetermined value). After determining that the lane change has started, the preceding vehicle determination unit 512 calculates the distance between the other of the left and right ends (for example, left end) of the preceding vehicle 10A and the division line (right division line) DL, and determines that the lane change has finished at the time that the distance becomes equal to or greater than a predetermined value (second predetermined value). After the completion of the lane change, the subject vehicle 10 stops following and performs lane keeping, for example.

In addition to the cut-in travel and the lane change of the preceding vehicle 10A illustrated in FIGS. 4A and 4B, wobbling or the like of the preceding vehicle 10A may result in the preceding vehicle 10A crossing the division lines DL, in which case the accuracy of recognition of the division lines DL may also be lowered due to the presence of the preceding vehicle 10A. Therefore, in cases other than the cases of FIGS. 4A and 4B, the preceding vehicle determination unit 512 also determines whether the accuracy of recognition of the division lines DL is lowered due to the presence of the preceding vehicle 10A using signals from the preceding vehicle detector 12. For example, the preceding vehicle determination unit 512 compares the travel track CL2 (FIG. 1B) of the preceding vehicle 10A obtained from camera images with the center line CL1 (FIG. 1A) of the lane LN, and determines whether the angle of the travel track CL2 deviates from the angle of the center line CL1 by a predetermined value or more, thereby determining whether the accuracy of recognition of the division lines DL is lowered. In response to determining that the accuracy of recognition of the division lines DL is lowered, the preceding vehicle determination unit 512 outputs an invalidation flag for invalidating the division lines DL recognized from camera images.

When the invalidation flag is not output from the preceding vehicle determination unit 512, the actuator control unit 513 in FIG. 3 recognizes the division line DL in front of the subject vehicle 10 based on the image obtained by the camera 11. Then, the target route is generated based on the position of the recognized division line DL, and the actuator AC is controlled so that the subject vehicle 10 travels along the target route by self-driving. On the other hand, when the invalidation flag is output from the preceding vehicle determination unit 512, the actuator control unit 513 sets the reliability with respect to the division line DL recognized by the camera image to a small value, for example, to 0, and invalidates the division line DL recognized based on the camera image. In this case, the actuator control unit 513 specifies the position of the division line DL in front of the subject vehicle 10 from the road map information stored in the memory unit 52 corresponding to the current position of the subject vehicle 10. Then, the actuator control unit 513 generates the target route based on the position of the division line DL, and controls the actuator AC so that the subject vehicle 10 travels along the target route by self-driving.

When the invalidation flag of the camera image is not output, the actuator control unit 513 further determines whether or not a difference (angular deviation) between an extending angle of the division line DL in front of the subject vehicle 10 recognized by the camera image and an extending angle of the division line DL in front of the subject vehicle 10 specified by the road map information is a predetermined value (for example, 3°) or more. That is, unmatching determination of the division line DL is performed. When it is determined that the angular deviation is the predetermined value or more, the actuator control unit 513 lowers the automatic driving level by one step or two or more steps. As a result, for example, drive mode is automatically switched from self-drive mode to manual drive mode. The actuator control unit 513 does not perform the unmatching determination when the invalidation flag of the camera image is output from the determination unit 512. Therefore, when the invalidation flag is output, the automatic driving level is maintained.

When the invalidation flag is continuously output for a predetermined time, a notification control unit 514 outputs a control signal to the display 31, and causes the display 31 as a command output portion to display a hands-on request. Instead of the hands-on request, switching to manual drive mode or notice of switching may be displayed on the display 31. The notification control unit 514 may output the control signal to the speaker in the vehicle to notify the driver of the hands-on request or the switching to manual drive mode by voice. That is, a microphone may be configured as the command output portion instead of the display 31.

Figure 5:
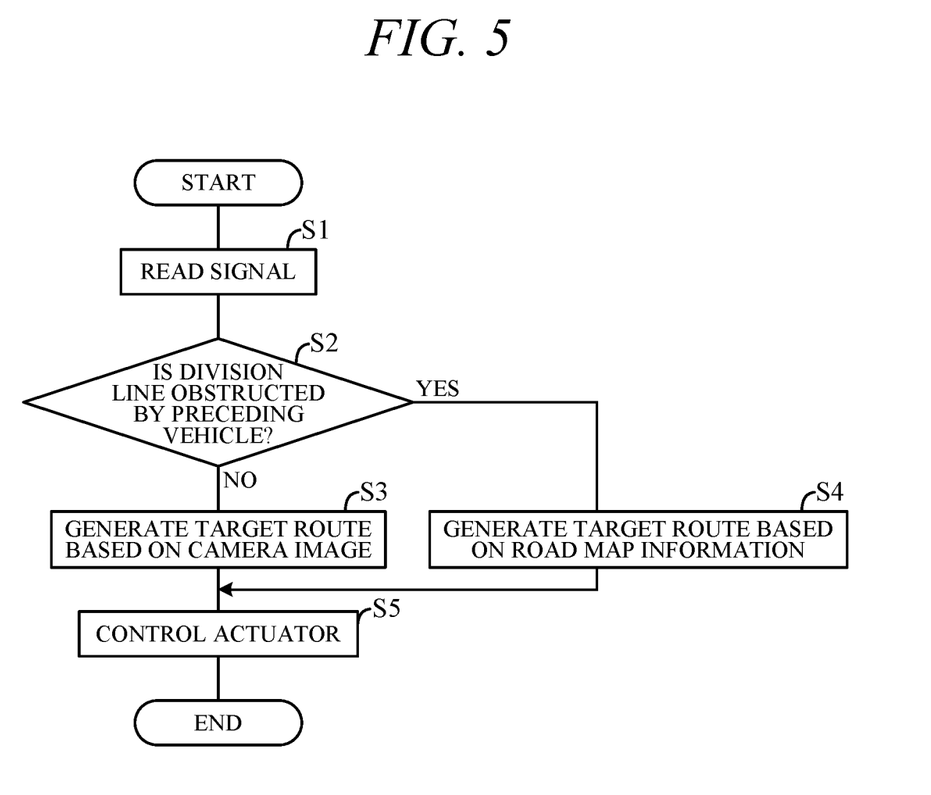
FIG. 5 is a flowchart illustrating an example of processing executed by a controller of FIG. 3.

FIG. 5 is a flowchart illustrating an example of processing executed by the controller 50. The processing shown in this flowchart is started, for example, when self-drive mode is selected, and the processing is repeated at a predetermined cycle as long as self-drive mode is continued.

First, in S1 (S: processing step), signals from the position measurement unit 4, the camera 11 and the preceding vehicle detector 12 are read. At this time, the road map information stored in the memory unit 52 is also read. Next, in S2, based on the signal and information read in S1, it is determined whether the acquisition of images of the division line DL on the road surface in the traveling direction of the subject vehicle 10 is obstructed by cut-in and lane change or the like of the preceding vehicle 10A, i.e., whether the sufficient image of the division line DL is included in the camera image. This determination is a determination as to whether or not the invalidation flag of the camera image is output from the preceding vehicle determination unit 512.

When a negative determination is made in S2, the processing proceeds to S3. In S3, the division line DL is recognized based on the camera image, and the target route is generated using the recognized division line DL. At this time, the unmatching determination of the division line DL is also performed, and when unmatching is determined, the automatic driving level is lowered.

On the other hand, if a positive determination is made in S2, it is determined that the reliability of the division line DL recognized by the camera image is 0, and the processing proceeds to S4. In S4, the division line DL in front of the subject vehicle 10 is specified based on the road map information corresponding to the current position of the subject vehicle 10, and the target route is generated using the specified division line DL. At this time, the unmatching determination of the division line DL is not performed. The processing of S4 may be performed only for a predetermined time (for example, 2 seconds) after a positive determination is made in S2.

In S5, a control signal is output to the actuator AC so that the subject vehicle 10 travels along the target route generated in S3 or S4, and the processing ends.

The operation of the vehicle travel control apparatus 101 according to the present embodiment will be described in more detail. When the preceding vehicle 10A is not present in front of the subject vehicle 10, the subject vehicle 10 performs lane keeping, for example, by self-driving. In this case, the positions of the left and right division lines DL are recognized on the basis of images captured by the camera 11, and the actuator AC is controlled such that the subject vehicle 10 travels by self-driving along the center line CL1 passing through the center of the left and right division lines DL (S3 to S5).

At this time, if the preceding vehicle detector 12 detects that the preceding vehicle 10A is cutting in (FIG. 4A), the acquisition of images of the division lines DL by the camera 11 is hindered, and the accuracy of recognition of the division lines DL by the camera 11 is lowered. In this case, without using camera images, the division lines DL are recognized on the basis of road map information corresponding to the current position of the subject vehicle 10, and the actuator AC is controlled on the basis of the position information of the division lines DL (S4 to S5). As a result, even when the acquisition of images by the camera 11 is hindered by the preceding vehicle 10A that is cutting in, it is possible to continue successful driving in self-drive mode, and it is possible to achieve self-driving that is comfortable for the driver.

On the other hand, when the preceding vehicle 10A is present in front of the subject vehicle 10 on the lane LN in which the subject vehicle 10 travels, the subject vehicle 10 follows the preceding vehicle 10A, for example, by self-driving. In this case, the positions of the left and right division lines DL are recognized on the basis of images captured by the camera 11, and the actuator AC is controlled such that the subject vehicle 10 travels by self-driving along the travel track CL2 of the preceding vehicle 10A (S3 to S5).

At this time, if the preceding vehicle detector 12 detects that the preceding vehicle 10A is changing lanes (FIG. 4B), the acquisition of images of the division lines DL by the camera 11 is hindered, and the accuracy of recognition of the division lines DL by the camera 11 is lowered. In this case, without using camera images, the division lines DL are recognized on the basis of road map information corresponding to the current position of the subject vehicle 10, and the actuator AC is controlled on the basis of the position information of the division lines DL (S4 to S5). As a result, even when the acquisition of images by the camera 11 is hindered by the preceding vehicle 10A that changes lanes, it is possible to continue successful driving in self-drive mode, and it is possible to achieve self-driving that is comfortable for the driver.

After the preceding vehicle 10A finishes cutting in or changing lanes, images of the division lines DL are no longer interrupted by images of the preceding vehicle 10A, and thus the actuator AC is controlled again on the basis of the division lines DL recognized from camera images. As a result, it is possible to perform self-driving in a successful manner using camera images. On the other hand, in the event that the division lines DL in camera images are blocked for more than a predetermined period of time (for example, two seconds) due to the presence of the preceding vehicle 10A, a hands-on request for the driver is output via the display 31. As a result, it is possible to prevent long-time driving in self-drive mode with camera images invalidated, and it is possible to automatically drive the subject vehicle 10 in a successful manner.

The present embodiment can achieve advantages and effects such as the following:

(1) The vehicle travel control apparatus 101 controls the traveling operation of the subject vehicle 10 including the traveling actuator AC, and includes: the camera 11 that is mounted on the subject vehicle 10 and captures an image of the division line DL in the traveling direction of the subject vehicle 10; the preceding vehicle detector 12 that is mounted on the subject vehicle 10 and detects the movement of the preceding vehicle 10A; and the actuator control unit 513 that controls the actuator AC on the basis of the position information of the division lines DL obtained by the camera 11 and the reliability (output or non-output of an invalidation flag) of the position information of the division lines DL obtained by the camera 11 (FIG. 3). In response to the preceding vehicle detector 12 detecting a predetermined behavior of the preceding vehicle 10A that intersects the division lines DL, the actuator control unit 513 invalidates camera images of the division lines DL. That is, the reliability of the division lines DL recognized from camera images is set to zero.

When images of the preceding vehicle 10A obtained by the camera 11 intersect with images of the division lines DL, images of the division lines DL are interrupted, which can result in a distorted recognition of images of the division lines DL. Therefore, if the actuator AC is controlled on the basis of camera images, the subject vehicle 10 is liable to wobble, for example. In this regard, in the present embodiment, in response to the detection of a predetermined behavior of the preceding vehicle 10A that intersects the division lines DL, camera images of the division lines DL are invalidated, which contributes to preventing the subject vehicle 10 from wobbling, for example, and achieving successful self-driving.

(2) A predetermined behavior of the preceding vehicle 10A as used herein is, for example, the operation of the preceding vehicle 10A to cut in front of the subject vehicle 10 (FIG. 4A). While cutting in, the preceding vehicle 10A crosses one of the division lines DL of the current lane LN ahead, in which case the use of camera images may cause erroneous recognition of the division lines DL. However, in the present embodiment, because camera images are invalidated in this case, driving in self-drive mode can be stably performed without frequent switching of drive mode to manual drive mode.

(3) Another example of a predetermined behavior of the preceding vehicle 10A is the predetermined travel track CL2 of the preceding vehicle 10A that intersects images of the division lines DL (FIG. 1B, FIG. 4B). For example, when the preceding vehicle 10A traveling in the current lane LN changes lanes, the preceding vehicle 10A crosses one of the division lines DL of the current lane LN ahead, in which case the use of camera images may cause erroneous recognition of the division lines DL. However, in the present embodiment, because camera images are invalidated in this case as well, driving in self-drive mode can be stably performed. The use of the travel track CL2 of the preceding vehicle 10A contributes to not only detection of a lane change but also early detection of wobbling or the like of the preceding vehicle 10A.

(4) The vehicle travel control apparatus 101 further includes the position information acquisition unit 511a that acquires current position information of the subject vehicle 10, and the map information acquisition unit 511b that acquires map information including the position information of the division lines DL in the traveling direction of the subject vehicle 10 corresponding to the current position of the subject vehicle 10 identified by the position information acquired by the position information acquisition unit 511a (FIG. 3). In response to the preceding vehicle detector 12 detecting a predetermined behavior (cut-in or lane change) of the preceding vehicle 10A, the actuator control unit 513 controls the actuator AC on the basis of the position information of the division lines DL acquired by the map information acquisition unit 511b without using the position information of the division lines DL obtained by the camera 11. Accordingly, even when camera images are invalidated, self-driving can be continued without switching from self-drive mode to manual drive mode.

(5) While the actuator control unit 513 controls the actuator AC without using the position information of the division lines DL obtained by the camera 11, once the preceding vehicle 10A finishes cutting in or changing lanes, the predetermined behavior of the preceding vehicle 10A is no longer detected by the preceding vehicle detector 12. After that, the actuator control unit 513 controls the actuator AC using the position information of the division lines DL obtained by the camera 11. Thus, after camera images are invalidated due to the start of a cut-in or a lane change, once the cut-in or the lane change is completed, the traveling of the subject vehicle 10 is controlled again on the basis of camera images. Therefore, self-driving can be continuously performed in a successful manner.

(5) The vehicle travel control apparatus 101 further includes the notification control unit 514 that, in response to the preceding vehicle detector 12 detecting a predetermined behavior of the preceding vehicle 10A continuously for a predetermined period of time while the subject vehicle 10 travels by self-driving, outputs a control signal to the display 31 to output a driving operation request to the driver (FIG. 3). Thus, it is possible to notify the driver of a command for hands-on, switching to manual driving, or the like at an appropriate timing during self-driving, and it is possible to prevent long-time driving in self-drive mode with camera images invalidated.

Various modifications of the above embodiment are possible. Some examples are explained in the following. In the above embodiment, when cut-in of the preceding vehicle 10A with respect to the subject vehicle 10 during lane-keep traveling or lane change of the preceding vehicle 10A during following the preceding vehicle 10A is detected by the preceding vehicle detector 12, the actuator control unit 513 controls the actuator AC with camera images invalidated (sets the reliability to 0). However, the predetermined behavior of the preceding vehicle 10A detected by the preceding vehicle detector 12, i.e., a predetermined behavior such as intersecting the division lines DL, is not limited to cut-in or lane change, may be other behavior such as wandering of the preceding vehicle 10A. For example, actuator control unit calculates a difference between the center line CL1 determined by the image of the division lines DL (FIG. 1A) and the travel track CL2 of the preceding vehicle 10A (FIG. 1B), and when the difference is equal to or greater than a predetermined value, it may be determined that there is a predetermined behavior.

In the above embodiment, the actuator control unit 513 controls the actuator AC without using the position information of the division lines DL obtained by the camera image, i.e. invalidating the camera image, when a predetermined behavior of the preceding vehicle 10A is detected by the preceding vehicle detector 12. In other words, the actuator control unit sets the reliability with respect to the positional information of the division line DL obtained by the camera 11 to 0. However, the actuator control unit may control the actuator AC using the position information of the division lines DL by the camera image and the road map information acquired by the map information acquisition unit 511b. In this case, the actuator control unit may set a reliability with respect to positional information of the division line DL obtained by the camera 11 in accordance with the behavior of the preceding vehicle 10A, and change a weighting of division line data included in information of the camera image and division line data included in road map information in accordance with the reliability. For example, the smaller the reliability, the smaller the weighting of the division line data by the camera image, or the larger the weighting of the division line data of the road map information. Then, the division line DL may be specified by using an average value or the like of each data after weighting.

Although in the above embodiment, the division line DL in the traveling direction of the subject vehicle 10 is captured by the vehicle-mounted camera 11, the division line DL may be measured by another first sensor mounted on the subject vehicle. Therefore, an actuator control unit may control an actuator for traveling based on position information of the division line DL obtained by a first sensor other than the camera and a reliability of the positional information of the division line DL obtained by the first sensor. In the above embodiment, the movement of the preceding vehicle 10A is detected by the preceding vehicle detector 12 such as a radar, a lidar, and a camera mounted on the subject vehicle. However, the movement of the preceding vehicle may be detected by other second sensor. Therefore, the configuration of a second sensor is not limited to the above-described one. The first sensor and the second sensor may be configured by the same sensor. That is, the first sensor may have a function as the second sensor, or the second sensor may have a function as the first sensor. Thus, the number of the sensor can be saved. That is, the present invention includes not only the case in which the first sensor and the second sensor are provided separately, but also the case in which the function of the first sensor and the function of the second sensor are realized by a single sensor.

In the above embodiment, when the image of one of the left and right and right division lines DL defining the current lane LN and the image of the preceding vehicle 10A intersect, the camera images of both the left and right division lines DL are invalidated. However, only the camera image of one of the division lines may be invalidated. The angle of the travel track CL2 of the preceding vehicle 10A and the angle of the division line DL recognized by the camera images may be compared, and when the travel track CL2 deviates rightward in the traveling direction with respect to the division line DL, only the camera image of the division line DL on the right side may be invalidated, and when the travel track CL2 deviates leftward in the traveling direction with respect to the division line DL, only the camera image of the division line DL on the left side may be invalidated. In the above embodiment, by comparing the camera image obtained by the camera 11 and the road map information stored in the memory unit 52, unmatching determination of the camera image is perform. However, by comparing the camera image of an object (e.g., the division line DL or the preceding vehicle 10A) obtained by the camera 11 and the position information of the object obtained by other detector (e.g. radar or lidar), unmatching determination may be performed.

Although in the above embodiment, the actuator control unit 513 controls the actuator AC in accordance with the reliability with respect to the positional information of the division line DL obtained by the camera 11, it may control actuator AC without using the reliability. That is, when a predetermined movement of the preceding vehicle to intersect the division line is not detected, a actuator control unit may control the actuator for traveling based on the position information of the division line obtained by a sensor (a first sensor) such as the camera 11, while when the predetermined movement of the preceding vehicle is detected, the actuator control unit may stop controlling the actuator based on the position information of the division line obtained by the first sensor.

Although in the above embodiment, the vehicle travel control apparatus 101 is applied to the self-driving vehicle having a self-driving capability, a vehicle travel control apparatus according to the present invention can be also applied to vehicle (for example, vehicle having a driver assistance capability) other than the self-driving vehicle.

The present invention can also be used as a vehicle travel control method for controlling a traveling operation of a vehicle 10 including an actuator AC for traveling. The vehicle travel control method includes: capturing an image of a division line DL in a traveling direction of the vehicle 10 or measuring the division line DL; detecting a movement of a preceding vehicle 10A; and controlling the actuator AC based on a position information of the division line DL and a reliability with respect to the position information. The controlling includes decreasing the reliability when a predetermined movement of the preceding vehicle 10A to intersect the division line DL is detected.

The above embodiment can be combined as desired with one or more of the above modifications. The modifications can also be combined with one another.

According to the present invention, it is possible to satisfactorily control a traveling operation of a vehicle even when a recognition accuracy of a division line decreases due to a movement of a preceding vehicle.

Above, while the present invention has been described with reference to the preferred embodiments thereof, it will be understood, by those skilled in the art, that various changes and modifications may be made thereto without departing from the scope of the appended claims.

What is claimed is:

1. A vehicle travel control apparatus configured to control a traveling operation of a vehicle including an actuator for traveling, the vehicle travel control apparatus comprising:
   a first sensor mounted on the vehicle to capture an image of a pair of left and right division lines in a traveling direction of the vehicle or measure the pair of left and right division lines, the pair of left and right division lines defining a lane along which the vehicle is traveling;
   a second sensor mounted on the vehicle to detect a movement of a preceding vehicle; and
   an electronic control unit including a microprocessor and a memory connected to the microprocessor, wherein
   the microprocessor is configured to perform:
   controlling the actuator based on position information of the pair of left and right division lines obtained by the first sensor and a reliability with respect to the position information obtained by the first sensor, and
   the controlling including decreasing only the reliability with respect to the position information of one of the pair of left and right division lines when a predetermined movement of the preceding vehicle to intersect the one of the pair of left and right division lines is detected by the second sensor,
   the microprocessor is further configured to perform
   determining whether the movement of the preceding vehicle detected by the second sensor is the predetermined movement,
   the determining including recognizing a travel track of the preceding vehicle from the movement of the preceding vehicle detected by the second sensor and determining whether an angle between the travel track and a center line of the lane passing through a center of the pair of left and right division lines is equal to or more than a predetermined value, and
   the controlling further including decreasing the reliability when it is determined that the angle is equal to or more than the predetermined value.

2. The vehicle travel control apparatus according to claim 1, wherein the predetermined movement is a movement of the preceding vehicle to cut in front of the vehicle.

3. The vehicle travel control apparatus according to claim 1, wherein
   the predetermined movement is a movement of the preceding vehicle along a predetermined travel track to intersect the one of the pair of left and right division lines.

4. The vehicle travel control apparatus according to claim 3, wherein
   the microprocessor is configured to perform
   the determining further including determining that the predetermined movement starts when a distance between the one of the pair of left and right division lines and the predetermined travel track of the preceding vehicle is shorter than or equal to a predetermined distance.

5. The vehicle travel control apparatus according to claim 1, wherein
   the microprocessor is configured to further perform acquiring information of a current position of the vehicle, acquiring map information including position information of the pair of left and right division lines in the traveling direction at the current position of the vehicle, and the controlling including controlling the actuator based on the position information of the pair of left and right division lines included in the map information.

6. The vehicle travel control apparatus according to claim 5, wherein the microprocessor is configured to perform the controlling including controlling the actuator based on the position information of the pair of left and right division lines included in the map information and not based on the position information of the pair of left and right division lines obtained by the first sensor when the predetermined movement is detected by the second sensor.

7. The vehicle travel control apparatus according to claim 6, wherein the microprocessor is configured to perform the controlling including controlling the actuator based on the position information of the pair of left and right division lines obtained by the first sensor, if the predetermined movement is not detected by the second sensor when controlling the actuator not based on the position information of the pair of left and right division lines obtained by the first sensor.

8. The vehicle travel control apparatus according to claim 5, wherein the vehicle is configured so that a drive mode is switched between a self-drive mode and a manual drive mode, and the microprocessor is configured to further perform determining whether a second angle between the pair of left and right division lines specified by the position information obtained by the first sensor and the pair of left and right division lines specified by the map information is equal to or greater than a predetermined value, and the controlling further including switching the drive mode to the manual drive mode when it is determined that the second angle is equal to or more than the predetermined value during traveling in the self-driving mode.

9. The vehicle travel control apparatus according to claim 8, wherein the microprocessor is configured to further perform prohibiting determining whether the second angle is equal to or more than the predetermined value when it is determined that the movement of the preceding vehicle is the predetermined movement.

10. The vehicle travel control apparatus according to claim 1, wherein the vehicle is a self-driving vehicle having a self-driving function in which the actuator is controlled in accordance with an action plan, and the vehicle travel control apparatus further comprises a command output portion outputting request information of a driving operation to a driver when it is determined that the predetermined movement is continuously detected by the second sensor for a predetermined time period during traveling in a self-driving.

11. The vehicle travel control apparatus according to claim 1, wherein the microprocessor is configured to perform the determining further including determining that the predetermined movement starts when a distance between the one of the pair of left and right division lines and an end in a width direction of the preceding vehicle at a side of the one of the pair of left and right division lines is shorter than or equal to a predetermined distance.

12. The vehicle travel control apparatus according to claim 11, wherein the microprocessor is configured to further perform the determining including determining that the predetermined movement ends when a distance between the one of the pair of left and right division lines and another end in the width direction of the preceding vehicle is longer than or equal to a predetermined distance, after the distance between the one of the pair of left and right division lines and the end in the width direction of the preceding vehicle has been shorter than or equal to the predetermined distance.

13. A vehicle travel control method configured to control a traveling operation of a vehicle including an actuator for traveling, the vehicle travel control method comprising:

capturing an image of a pair of left and right division lines in a traveling direction of the vehicle or measuring the pair of left and right division lines, the pair of left and right division lines defining a lane along which the vehicle is traveling;

detecting a movement of a preceding vehicle;

controlling the actuator based on position information of the pair of left and right division lines and a reliability with respect to the position information; and determining whether the movement of the preceding vehicle is a predetermined movement in which the preceding vehicle intersects one of the pair of left and right division lines, wherein the controlling includes decreasing only the reliability with respect to the position information of the one of the pair of left and right division lines when the predetermined movement of the preceding vehicle is detected, the determining includes recognizing a travel track of the preceding vehicle from the movement of the preceding vehicle and determining whether an angle between the travel track and a center line of the lane passing through a center of the pair of left and right division lines is equal to or more than a predetermined value, and the controlling further includes decreasing the reliability when it is determined that the angle is equal to or more than the predetermined value.

* * * * *